United States Patent
Karulkar et al.

(10) Patent No.: US 10,224,525 B2
(45) Date of Patent: Mar. 5, 2019

(54) BATTERY SUPPORT ASSEMBLY AND METHOD WITH A DIVERGING FLOW PATH

(71) Applicant: Ford Global Technologies, LLC, Dearborn, MI (US)

(72) Inventors: Mohan Karulkar, Dearborn, MI (US); Thomas J. Coupar, Ann Arbor, MI (US); Brian Joseph Robert, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/382,868

(22) Filed: Dec. 19, 2016

(65) Prior Publication Data

US 2018/0175340 A1 Jun. 21, 2018

(51) Int. Cl.
*H01M 2/10* (2006.01)
*H01M 10/625* (2014.01)
*H01M 10/6557* (2014.01)
*H01M 10/6567* (2014.01)

(52) U.S. Cl.
CPC ....... *H01M 2/1072* (2013.01); *H01M 10/625* (2015.04); *H01M 10/6557* (2015.04); *H01M 10/6567* (2015.04); *H01M 2220/20* (2013.01)

(58) Field of Classification Search
CPC .................. H01M 2/1072; H01M 2220/20
USPC ........................................................ 429/50
See application file for complete search history.

(56) References Cited

U.S. PATENT DOCUMENTS

| 9,312,571 B2 | 4/2016 | Wang et al. |
| 2005/0089750 A1* | 4/2005 | Ng ................ H01M 2/0242 429/120 |
| 2009/0023056 A1 | 1/2009 | Adams et al. |
| 2016/0308262 A1 | 10/2016 | Masias et al. |

FOREIGN PATENT DOCUMENTS

DE     102010055609     6/2012

OTHER PUBLICATIONS

U.S. Appl. No. 14/831,333.

* cited by examiner

*Primary Examiner* — Gary D Harris
(74) *Attorney, Agent, or Firm* — Carlson, Gaskey & Olds, P.C.

(57) ABSTRACT

An exemplary battery support assembly includes a bladder device with a pocket that receives at least one battery cell of a traction battery. The bladder provides a fluid flow path that diverges at an end of the pocket into a first section on a first side of the pocket and a second section on an opposing, second side of the pocket. An exemplary battery support method includes moving a flow of fluid along a fluid flow path toward at least one battery cell; and diverging the flow into a first or second section of the fluid flow path such that the flow moves along opposing sides of the at least one battery cell.

20 Claims, 4 Drawing Sheets

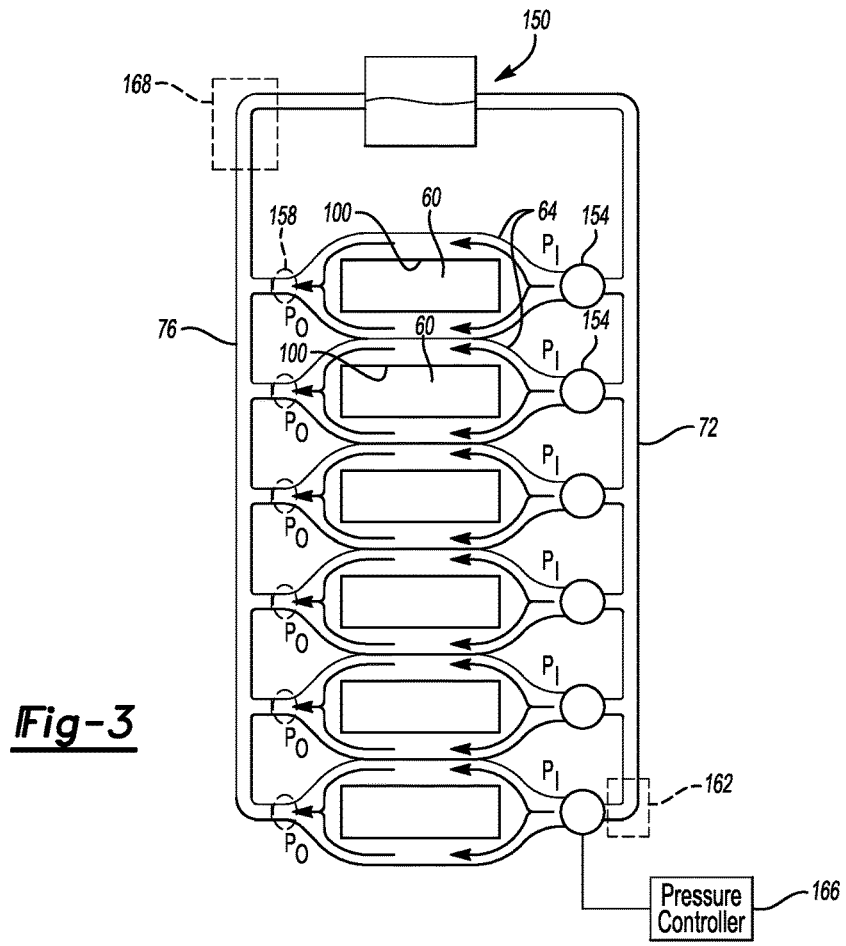
_Fig-3_
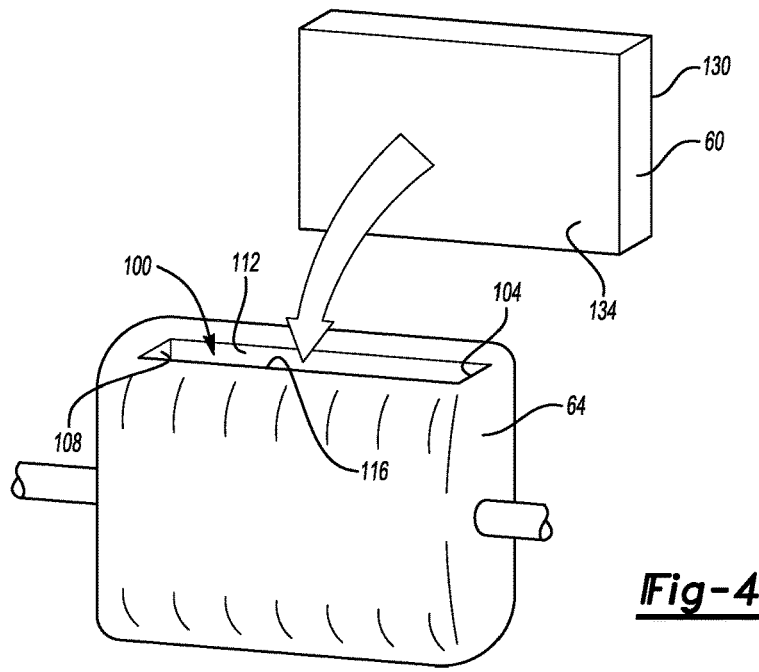
_Fig-4_

BATTERY SUPPORT ASSEMBLY AND METHOD WITH A DIVERGING FLOW PATH

TECHNICAL FIELD

This disclosure relates to a battery support. More particularly, the disclosure is directed toward supporting a battery cell of an electrified vehicle with a flexible bladder containing a fluid.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage traction battery that selectively powers the electric machines and other electrical loads of the electrified vehicle. The traction battery includes a plurality of interconnected battery cells that store energy. Some traction batteries support battery cells with relatively rigid retention devices.

SUMMARY

A battery support assembly according to an exemplary aspect of the present disclosure includes, among other things, a bladder device with a pocket that receives at least one battery cell of a traction battery. The bladder provides a fluid flow path that diverges at an end of the pocket into a first section on a first side of the pocket and a second section on an opposing, second side of the pocket.

In a further non-limiting embodiment of the foregoing assembly, the end is a first end, and the first section and the second section converge at an opposing, second end of the pocket.

In a further non-limiting embodiment of any of the foregoing assemblies, the assembly includes the at least one battery cell within the pocket. The bladder is circumferentially distributed about an entire perimeter of the at least one battery cell.

In a further non-limiting embodiment of any of the foregoing assemblies, the assembly includes the at least one battery cell within the pocket. The bladder and the at least one battery cell are compressed against each other.

In a further non-limiting embodiment of any of the foregoing assemblies, the bladder device is a first bladder device, and the assembly includes a second bladder device. Fluid is communicated to the first bladder device and the second bladder device from a common input conduit.

In a further non-limiting embodiment of any of the foregoing assemblies, the bladder device diverges at a fluid inlet to the first section and a fluid inlet to the second section, and the bladder device converges at a fluid outlet from the first section and a fluid outlet from the second section.

In a further non-limiting embodiment of any of the foregoing assemblies, the bladder device is expandable and contractible.

In a further non-limiting embodiment of any of the foregoing assemblies, the assembly includes a pump that moves a fluid through the fluid flow path.

In a further non-limiting embodiment of any of the foregoing assemblies, the pump is a peristaltic pump upstream from where the fluid flow path diverges.

In a further non-limiting embodiment of any of the foregoing assemblies, the assembly includes the at least one battery cell within the pocket. The at least one battery cell has a terminal side with a terminal, and a plurality of other sides aligned traverse to the terminal side. The first side of the pocket and the second side of the pocket are positioned along the other sides of the battery cell.

A battery support method according to an exemplary aspect of the present disclosure includes, among other things, moving a flow of fluid along a fluid flow path toward at least one battery cell, and diverging the flow into a first or second section of the fluid flow path such that the flow moves along opposing sides of the at least one battery cell.

In a further non-limiting embodiment of the foregoing method, the method includes converging flow from the first and second sections together and moving the flow away from the battery cell.

In a further non-limiting embodiment of any of the foregoing methods, the method includes transferring thermal energy between the fluid and the battery cell to manage thermal energy within the at least one battery cell.

In a further non-limiting embodiment of any of the foregoing methods, the method includes circumferentially surrounding the at least one battery cell with the fluid flow path.

In a further non-limiting embodiment of any of the foregoing methods the at least one battery cell is at least one first battery cell, and the method further comprises using a first peristaltic pump to selectively increase or decrease the flow, and using a second peristaltic pump to selectively increase or decrease a flow to another fluid flow path that diverges to move along opposing sides of at least one second battery cell.

A further non-limiting embodiment of any of the foregoing methods includes increasing or decreasing the flow with the first peristaltic pump in response to a sensed condition from the at least one first battery cell, and separately increasing or decreasing the flow with the second peristaltic pump in response to a sensed condition from the at least one second battery cell.

In a further non-limiting embodiment of any of the foregoing methods, the fluid flow path is provided by a flexible bladder.

In a further non-limiting embodiment of any of the foregoing methods, expansion of the at least one battery cells forces fluid out of the first and second section.

In a further non-limiting embodiment of any of the foregoing methods, the method includes moving the flow of fluid between a fluid supply and the first and second sections, and estimating a condition of the at least one battery cell based on an amount of fluid within the fluid supply.

In a further non-limiting embodiment of any of the foregoing methods, the method includes supporting the at least one battery cell with the first and second sections.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a top, schematic view of the traction battery of FIG. 3 with the enclosure removed.

FIG. 4 illustrates a perspective view of a battery cell and bladder device from the traction battery of FIG. 2 with the battery cell outside a pocket of the bladder device.

DETAILED DESCRIPTION

This disclosure relates to supporting battery cells within a traction battery of an electrified vehicle. The battery cells are supported with a bladder device containing fluid. The bladder device can accommodate expansion and contraction of the battery cells while still supporting and contacting the battery cells. Fluid can be moved through the bladder device to manage thermal energy levels within the battery cell and remaining portions of the traction battery.

Figure 1:
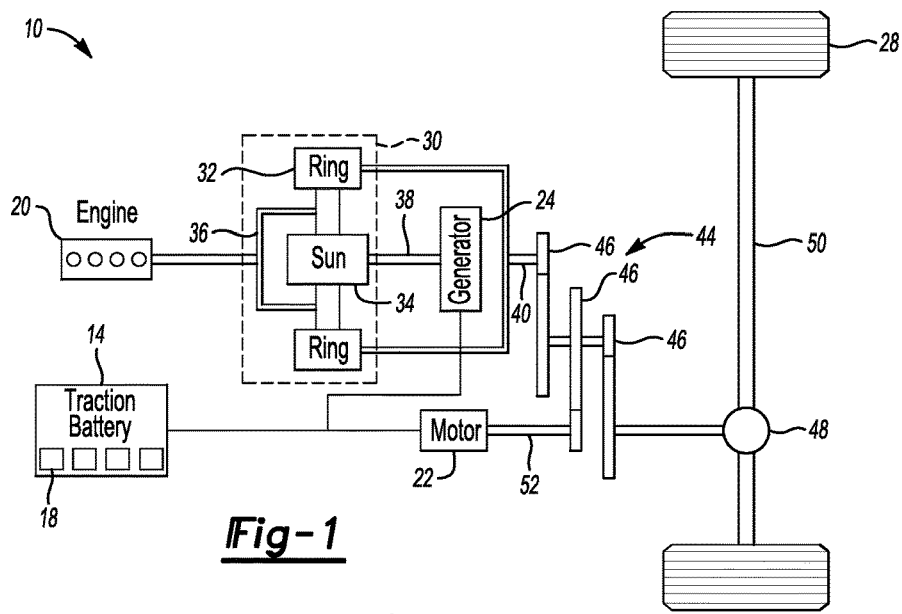
FIG. 1 schematically illustrates an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
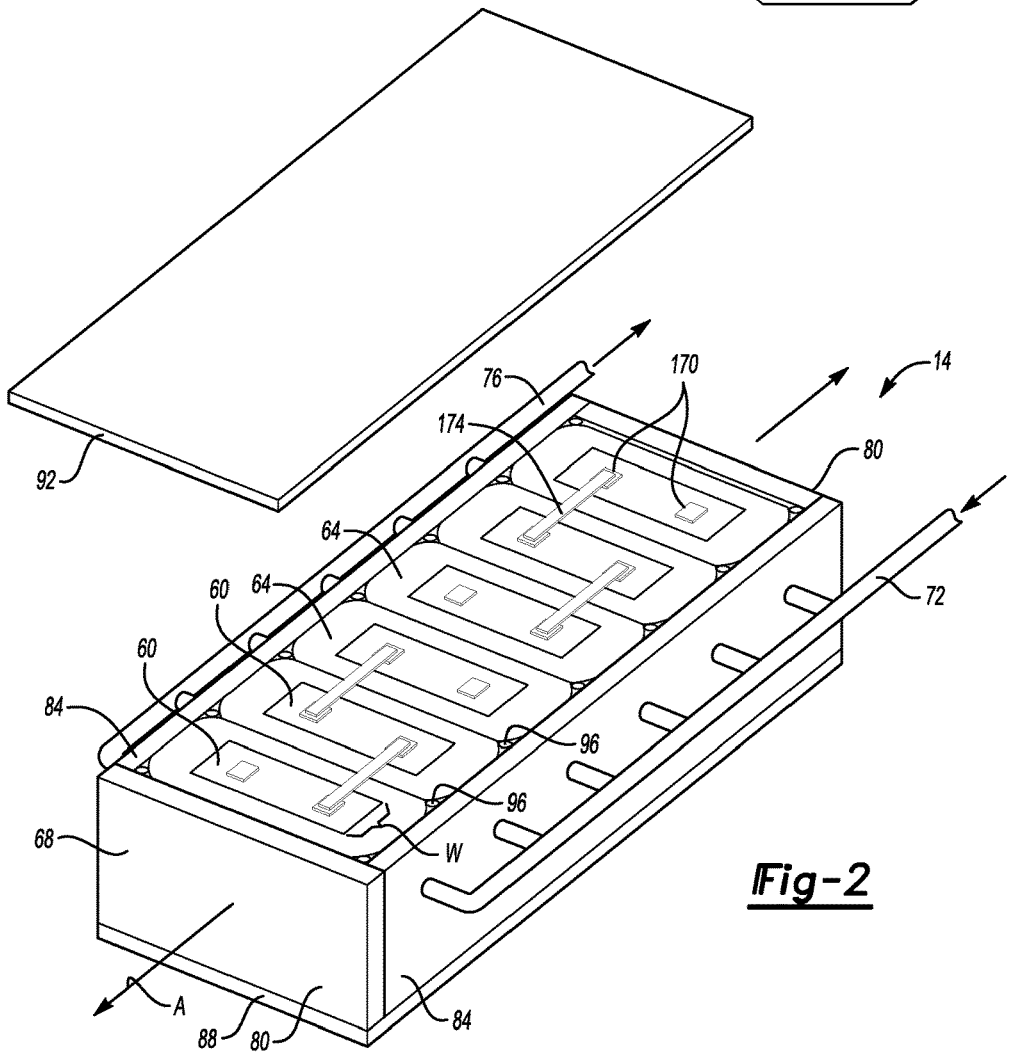
FIG. 2 illustrates a partially expanded, perspective view of an example traction battery from the powertrain in FIG. 1.

Referring now to FIG. 2, the traction battery 14, according to an exemplary, non-limiting embodiment, includes a plurality of individual battery cells 60 as one of the arrays 18, a plurality of bladder devices 64, and an enclosure 68. The battery cells 60 are disposed along an axis A. The bladder devices 64 support the battery cells 60 within the enclosure 68. More specifically, the exemplary bladder devices 64 can limit movement of the battery cells 60 relative to each other and to other areas of the traction battery 14. Holding the battery cells 60 can facilitate alignment of the battery cells 60 within the traction battery 14 when, for example, securing components to the traction battery 14 when manufacturing the traction battery 14.

In this example, the bladder devices 64 are made of a flexible polymer material, such as a rubber, that defines a changeable volume to contain a fluid.

Fluid can move through the bladder devices 64. Fluid moves to the bladder devices 64 from an inlet conduit 72. Fluid moves from the bladder devices 64 through an outlet conduit 76. In another example, each of the bladder devices 64 is supplied by a separate conduit, such that each of the bladder devices 64 provides a portion of a fluid circuit separate from the fluid circuits of the other bladder devices 64 within the traction battery 14.

The fluid moved through the bladder devices 64 could be a liquid or gas. The fluid can be a coolant, such as 50/50 mix of water and ethylene glycol.

The battery cells 60 can expand and contract during cycling. The bladder devices 64 expand and contract with the battery cells 60 so that the battery cells 60 remain supported. The bladder devices 64 hold less fluid when the battery cells 60 are expanded than when the battery cells 60 are contracted.

The exemplary enclosure 68 includes a pair of opposing end walls 80, a pair of opposing side walls 84, a bottom plate 88, and a top plate 92. The enclosure 68 holds the bladder devices 64 and battery cells 60.

In this example, a plurality of spacers 96 are also held within the enclosure 68. The spacers 96 can occupy areas within the enclosure 68 to prevent the bladder device 64 from moving into these areas. The spacers 96 can be, for example, support studs that support components of the enclosure 68, such as the bottom plate 88 and the top plate 92.

The spacers 96 and the enclosure 68 are relatively rigid when compared to the bladder devices 64. Accordingly, movement of the bladder devices 64 against the spacers 96 and the enclosure 68 does not move the spacers 96 and the enclosure 68.

The bladder devices 64 directly contact the battery cells 60 to support the battery cells 60. Since the bladder devices 64 can accommodate expansion and contraction of the battery cells 60 during cycling, the battery cells 60 remain supported by the bladder devices 64 during cycling. As can be appreciated, relatively rigid supports may be unable to accommodate significant expansion and contraction of the battery cells 60 within the traction battery 14.

Six individual battery cells 60 are shown in this exemplary traction battery 14, but any number of battery cells 60 could be used. Some example traction batteries 14 could include up to one hundred individual battery cells 60 grouped in arrays of ten battery cells.

The example battery cells 60 have a rectangular profile. In other examples the battery cells 60 could be cylindrical. The cells could be pouch cells, prismatic cells, can cells, etc.

The example battery cells 60 are silicon (Si) based battery cells. Some silicon based battery cells have shown volume expansions of greater than 200% during cycling, which can increase an axial width W of the battery cells 60 by up to 20% during cycling.

Other exemplary battery cells 60 that can expand significantly during cycling include germanium (Ge) based battery cells and tin (Sn) based battery cells.

Although the bladder devices 64 are described in connection with supporting silicon based battery cells and battery cells that expand significantly during cycling, the teachings of this disclosure are not limited to such battery cells. The bladder devices 64 could be used to support battery cells of any type, including lithium-titanate (LTO) based battery cells, and graphite based battery cells.

Referring now to FIGS. 3 and 4, each of the bladder devices 64 provides a pocket 100, or open area, that receives at least one of the battery cells 60. In this example, the pocket 100 receives one of the battery cells 60. In another example, the pocket 100 receives, for example, two of the battery cells 60.

In this exemplary non-limiting embodiment, the pockets 100 each have a first end 104, a second end 108, a first side 112, and a second side 116. The first end 104 opposes the second end 108. The first side 112 is opposite the second side 116. The pocket 100 can be dimensioned to generally track an outer profile of the battery cells 60 received within the pocket 100.

The bladder device 64 establishes a fluid flow path extending from a path inlet $P_I$ to a path outlet $P_O$. At the first end 104 of the pocket 100, the fluid flow path from the inlet $P_I$ diverges into an inlet of a first flow path section 120 and an inlet of a second flow path section 124.

The first section 120 of the fluid flowpath extends along the first side 112 of the pocket 100. The second section 124 of the fluid flowpath extends along the second side 116 of the pocket 100. When the battery cell 60 is positioned within the pocket 100, the first section 120 is positioned along a first axially facing side 130 of the battery cell 60, and the second section 124 is positioned along a second axially facing side 134 of the battery cell 60. The first axially facing side 130 and the second axially facing side 134 face in opposite directions.

At the second end 108 of the pocket 100, flow from an outlet of the first flow path section 120 and an outlet of the second flow path section 124 converges into the outlet $P_O$.

The diverging of the fluid flow path from the inlet $P_I$ into the first section 120 and the second section 124, and the subsequent converging of the fluid flow from the first section 120 and the second section 124 into the path outlet $P_O$, permits the fluid flow path to circumferentially surround an entire perimeter of the battery cell 60 when the battery cell is positioned within the pocket 100. The bladder device 64 provides the fluid flow path and thus also circumferential surrounds the battery cell 60 positioned within the pocket 100.

The path inlet $P_I$ receives fluid from the inlet conduit 72. The fluid moves to the inlet conduit 72 from a fluid supply 150.

In this exemplary embodiment, a pump 154, such as a peristaltic pump, is associated with each of the bladder devices 64. The exemplary pump 154 is upstream from where the fluid flow path through the bladder device 64 diverges. Fluid pressure within the bladder devices 64 can be adjusted using the pumps 154. In another example, a pump is used to move fluid to from the fluid supply 150 to more than one of the bladder devices. The pumps 154 can prevent, in some examples, backflow of fluid from the bladder devices 64 to the inlet conduit 72, which could reduce support of the battery cells 60 provided by the bladder devices 64.

To further control fluid pressure in the bladder devices 64, the areas near the path outlet PO may have a reduced diameter so that fluid pressure is not released through the path outlet PO and pressure is held within the bladder devices 64. Instead, or additionally, areas near the path outlets PO could be equipped with check valves 158 to prevent the bladder devices 64 from deflating through the path outlets PO when the pumps 154 are not providing positive pressure, such as when the traction battery 14 is not operating. Check valves could instead, or additionally, be incorporated in other areas of the fluid flow path.

Areas of the fluid flow path could also incorporate pass through pressure release valves 162, which could prevent over-pressurizing the bladder devices 64.

In some examples, flow through the fluid flow path is controlled by a pressure controller 166 that is programmed to operate the pumps 154, actuate the check valves 158, actuate the pressure release valves 162, or some combination of these. The pressure controller 166 is programmed to maintain the fluid pressure within the flow path, and particularly within the bladder devices 64 within a desired pressure range or to move a desired amount of fluid through the bladder devices 64, for example. The pumps 154 could be controlled to permit less flow to one or more of the bladder devices 64 of the traction battery pack 14 while permitting more flow to one or more other bladder devices 64 of the traction battery pack 14.

The pumps 154 could be, for example, controlled to selectively increase or decrease flow to one bladder device 64 in response to a sensed condition from the battery cell 60 held by that bladder device 64. The sensed condition could be provided by a sensor that is used to measure a temperature of that battery cell 60, a pressure of that battery cell 60, both temperature and pressure, or some other condition. The sensor could be integrated on the battery cell 60. The sensor could be positioned within the pocket between the battery cell 60 and the bladder device 64.

Figure 5:
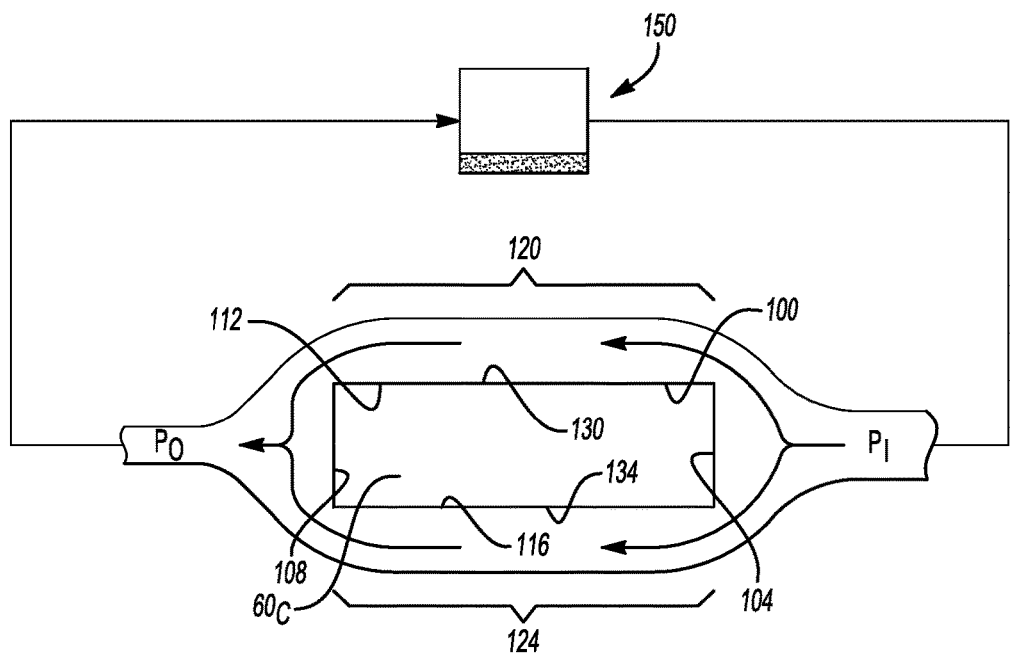
FIG. 5 illustrates a top view of the battery cell within a pocket of the bladder device of FIG. 4.
Figure 6:
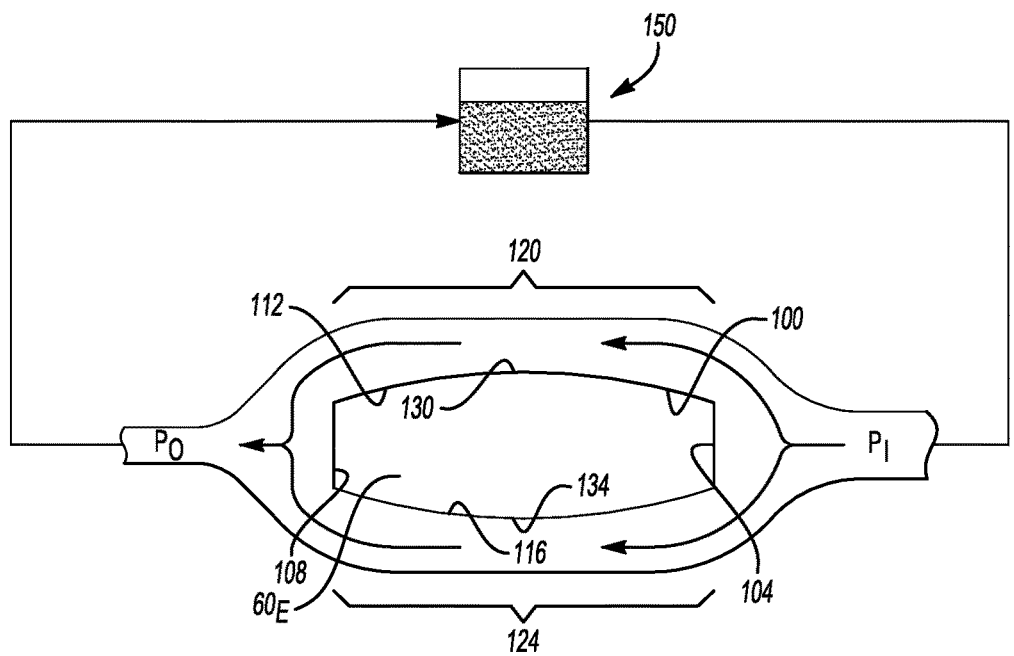
FIG. 6 illustrates a top view of the battery cell within a pocket of the bladder device of FIG. 3 when the battery cell has expanded from the position of FIG. 5.

With continuing reference to FIG. 2, FIG. 5 shows the battery cell 60 having a first axial width, and FIG. 6 shows the battery cell 60 having a second, greater axial width due to expansion of the battery cells 60. Expansion of the battery cells 60 can occur during normal operation due to certain expansion/contraction-prone anode materials. Such materials could include silicon, lithium, tin, etc. Battery cells 60 can also expand due to gas buildup within an interior of the battery cells 60, either over time from normal operation, or over a shorter period of time due to a fault condition.

The expansion is directed primarily through the first axially facing side 130 and the second axially facing side 134 as these sides are larger than the remaining sides, and additionally because the bottom plate 88 and the top plate 92 can restrict upward and downward expansion of the battery cell 60.

In other words, the enclosure 68 can constrain expansion of the battery cells 60 so that the expansion is concentrated along the axis A in directions perpendicular to the sides 130 and 134 of the battery cells 60.

Although the enclosure 68 is shown, other examples could use other devices to constrain expansion of the battery cells 60 to desired directions. Straps, binding bars, etc. are other examples of such devices.

As the battery cell 60 expands from the position of FIG. 5 to the position of FIG. 6, the volumes of the first section 120 and the second section 124 are reduced. The reduction in volumes accommodates the increased thickness of the battery cell 60. Even though the battery cells 60 expands, the first side 112 and the second side 116 maintain contact against the battery cell 60 due to the pressurized fluid within the first section 120 and the second section 124.

Reducing the volumes of the first section 120 and the second section 124 displaces fluid from the bladder device 64. The fluid displaced from the first section 120 and the second section 124 increases a level of fluid within the fluid supply 150.

In some examples, a level of fluid in the fluid supply is monitored automatically, by observation, or both. An increase in a level of fluid within the fluid supply 150 can indicate that a size of one or more of the battery cell 60 has increased. The indication can be noted without requiring a technician to open the enclosure 68 of the traction battery 14. For example, a sudden change in a height of the fluid within the fluid supply 150 could indicate a fault condition, such as a rapid expansion of battery cells 60 with the traction battery 14.

In some examples, fluid in the bladder device 64 can be used to manage thermal energy levels in the battery cell 60 in addition to supporting the battery cells 60. For example, fluid in the bladder device 64 can take on thermal energy from the battery cell 60 when the fluid moves through the first section 120 and the second section 124. This cools the battery cell 60. The heated fluid can be cooled using a heat exchanger 168, for example, and then recirculated to the fluid supply 150.

The fluid could also be heated so that, when moving through the bladder devices 64, the fluid heats the battery cells 60. Further, resistive heaters could be incorporated into the bladder devices 64 to heat the fluid, the battery cells 60, or both.

If the fluid in the bladder devices 64 is used to heat or to cool the battery cells 60, the pressure controller 166 may adjust the speed of the individual pumps 154 to move varying amounts of fluid through the bladder devices 64. More fluid movement may be required through one of the bladder devices 64 if, for example, the battery cell 60 held by that bladder device 64 is heating more rapidly than the other battery cells 60 in the traction battery 14. Maintaining the battery cells 60 within a particular temperature range can enhance efficiency of the traction battery 14.

Referring again to FIG. 2 with continuing reference to FIGS. 3 to 6, the surfaces of the battery cells 60 facing the top plate 92 include at least two terminals 170. Bus bars 174 can be used to electrically connect the terminals 170 of the battery cells 60. The bus bars 174 are a metal or metal alloy and are rigid relative to the battery cells 60 and the bladder devices 64. Although shown as facing the top plate 92 one or both the terminals 170 could be located in another area, such as facing the bottom plate 88, and connected by other bus bars.

Electrical energy can move to and from the battery cells 60 through the bus bars 174. Electrical energy could also move to and from the traction battery 14 with bus bars or other electrical connectors. The battery cells 60 could be electrically connected in series or in parallel.

Figure 7:
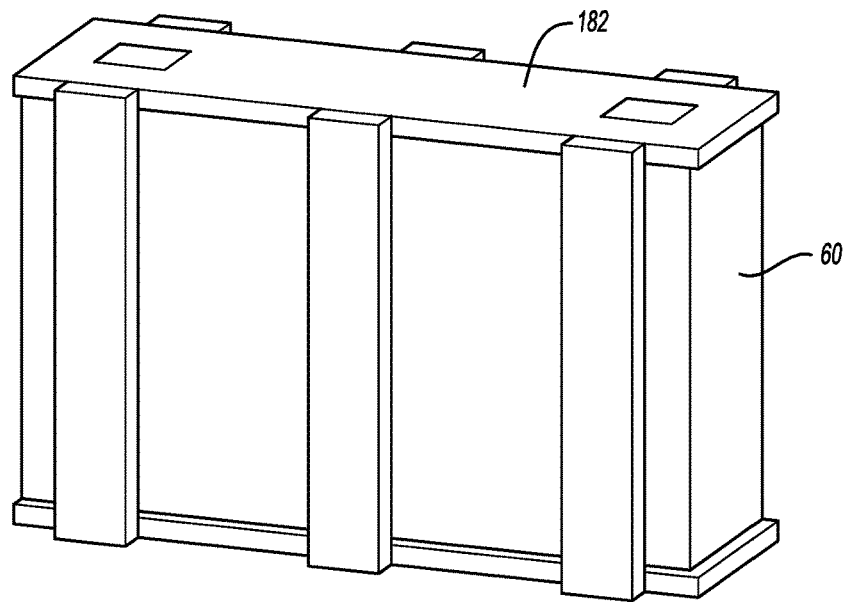
FIG. 7 illustrates a perspective top view of a battery cell from the traction battery of FIG. 2 according to another exemplary embodiment of the present disclosure.
Figure 8:
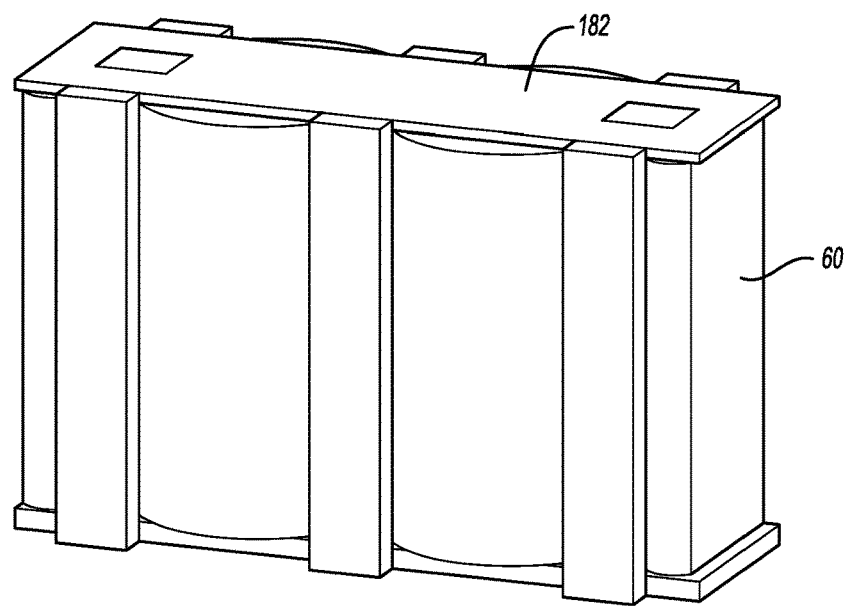
FIG. 8 illustrates the battery cell of FIG. 7 when the battery cell has expanded from the position of FIG. 7.

Referring now to FIGS. 7 and 8, in a non-limiting variation of the above embodiments, the battery cells 60 are positioned within a fixture 182 and then positioned within the pockets 100. The fixture 182 constrains expansion of the battery cells 60 to be concentrated in an axial direction between vertically extending supports 186 of the fixture 182. A base plate 190 and top plate 194 of the fixture 182 constrains vertical expansion of the battery cells 60. The supports 186 connect to the base plate 190 and the top plate 194. In some non-limiting embodiments, the fixture 182 provides a base level of compression that the bladder device 64 (FIG. 4) alone may not be able to provide. Battery cells 60 can, in some examples, benefit from compression during cycling.

FIG. 7 shows the battery cell 60 in a less expanded position than the battery cell 60 of FIG. 8. In the battery cell 60 of FIG. 8, the expansion is concentrated in an axial direction between the vertically extending supports 186 of the fixture 182.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery support assembly, comprising:
   a bladder device with a pocket that receives at least one battery cell of a traction battery, the bladder providing a fluid flow path that diverges at an end of the pocket into a first section on a first side of the pocket and a second section on an opposing, second side of the pocket.

2. The battery support assembly of claim 1, wherein the end is a first end, and the first section and the second section converge at an opposing, second end of the pocket.

3. The battery support assembly of claim 1, further comprising the at least one battery cell within the pocket, the bladder is circumferentially distributed about an entire perimeter of the at least one battery cell.

4. The battery support assembly of claim 1, further comprising the at least one battery cell within the pocket, the bladder and the at least one battery cell compressed against each other.

5. The battery support assembly of claim 1, wherein the bladder device is a first bladder device, and further comprising a second bladder device, wherein fluid is communicating to the first bladder device and the second bladder device from a common input conduit.

6. The battery support assembly of claim 1, wherein the bladder device diverges at a fluid inlet to the first section and a fluid inlet to the second section, and the bladder device converges at a fluid outlet from the first section and a fluid outlet from the second section.

7. The battery support assembly of claim 1, wherein the bladder device is expandable and contractible.

8. The battery support assembly of claim 1, further comprising a pump that moves a fluid through the fluid flow path.

9. The battery support assembly of claim 8, wherein the pump is a peristaltic pump upstream from where the fluid flow path diverges.

10. The battery support assembly of claim 1, further comprising the at least one battery cell within the pocket, the at least one battery cell having a terminal side with a terminal, and a plurality of other sides aligned traverse to the terminal side, the first side of the pocket and the second side of the pocket are positioned along the other sides of the battery cell.

11. A battery support method, comprising:
providing a bladder device with a pocket that receives at least one battery cell;
within the bladder device, moving a flow of fluid along a fluid flow path toward the at least one battery cell; and
diverging the flow into a first or second section of the fluid flow path such that the flow moves along opposing sides of the at least one battery cell.

12. The battery support method of claim 11, further comprising converging flow from the first and second sections together and moving the flow away from the battery cell.

13. The battery support method of claim 11, further comprising transferring thermal energy between the fluid and the battery cell to manage thermal energy within the at least one battery cell.

14. The battery support method of claim 11, further comprising circumferentially surrounding the at least one battery cell with the fluid flow path.

15. The battery support method of claim 11, wherein the at least one battery cell is at least one first battery cell, and further comprising using a first peristaltic pump to selectively increase or decrease the flow, and using a second peristaltic pump to selectively increase or decrease a flow to another fluid flow path that diverges to move along opposing sides of at least one second battery cell.

16. The battery support method of claim 15, further comprising increasing or decreasing the flow with the first peristaltic pump in response to a sensed condition from the at least one first battery cell, and separately increasing or decreasing the flow with the second peristaltic pump in response to a sensed condition from the at least one second battery cell.

17. The battery support method of claim 11, wherein the bladder device is a flexible bladder device.

18. The battery support method of claim 11, wherein expansion of the at least one battery cells forces fluid out of the first and second section.

19. The battery support method of claim 11, further comprising moving the flow of fluid between a fluid supply and the first and second sections, and estimating a condition of the at least one battery cell based on an amount of fluid within the fluid supply.

20. The battery support method of claim 11, further comprising supporting the at least one battery cell with the first and second sections.

* * * * *